United States Patent [19]

Willan

[11] Patent Number: 5,195,701
[45] Date of Patent: Mar. 23, 1993

[54] AIR CARGO CONTAINER WITH BOMB DAMAGE MITIGATION FEATURES

[76] Inventor: W. Craig Willan, P.O. Box 574, Hurst, Tex. 76053

[21] Appl. No.: 830,725

[22] Filed: Feb. 4, 1992

[51] Int. Cl.⁵ ............................................. B64D 47/00
[52] U.S. Cl. ................................. 244/118.1; 244/129.1
[58] Field of Search .................. 244/118.1, 129.1, 119; 220/89.2, 89.3, 207, 261, 400; 52/232, 98, 99, 100

[56] References Cited

U.S. PATENT DOCUMENTS

| | | | |
|---|---|---|---|
| 3,864,881 | 2/1975 | Wolf | 52/1 |
| 4,046,277 | 9/1977 | Morrison | 244/118.1 |
| 4,049,221 | 9/1977 | Fountain | 52/98 |
| 4,678,215 | 7/1987 | Rehbein et al. | 220/89.2 |
| 4,750,303 | 6/1988 | Mullen | 52/1 |
| 4,821,909 | 4/1989 | Hibler et al. | 52/232 |
| 5,085,017 | 2/1992 | Hararat-Tehrani | 52/1 |

FOREIGN PATENT DOCUMENTS 2238283  5/1991  United Kingdom ............. 244/118.1

Primary Examiner—Joseph F. Peters, Jr.
Assistant Examiner—Anne E. Bidwell
Attorney, Agent, or Firm—James E. Bradley

[57] ABSTRACT

An air cargo container with features for reducing damage caused by a bomb explosion. The container has a venting device which faces a fuselage wall of an airplane when the container is stowed. An explosion propels the venting device to pierce the fuselage wall of the airplane in the event of an explosion. This creates a hole which vents the shock waves and gas from the explosion.

20 Claims, 4 Drawing Sheets

AIR CARGO CONTAINER WITH BOMB DAMAGE MITIGATION FEATURES

BACKGROUND OF THE INVENTION

1. Field of the invention

This invention relates in general to avoiding airplane crashes due to terrorist bombs, and in particular to a luggage or cargo container that has features for mitigating the damage of a bomb explosion.

2. Description of the Prior Art

The problem of dealing with terrorist bombs on board airlines has not been solved. Improved scanning of passenger luggage and air freight is not likely to be able to detect all bombs placed in luggage by a terrorist. A plastic explosive device hidden inside checked luggage stored within a lower cargo hold in a large airplane can cause a rapid breakup of the aircraft. Shock waves propagating within the aircraft from an explosion can cause numerous points of secondary damage, some resulting in actual breaching of the fuselage hull.

In large airliners, the checked luggage will be stowed in containers. These containers are then stowed in the cargo hold located below the passenger compartment. It is impractical to design a luggage cargo shipping container that can contain the high pressure gas and shock waves resulting from an explosion of a bomb. Pressures can exceed one million pounds per square inch during such an explosion. The walls of the container would have to be inordinately thick in order to contain the explosion. The thickness would make the containers too heavy to be feasible.

SUMMARY OF THE INVENTION

In this invention, a container is provided that will reduce the damage caused by the explosion in two manners. The container has a venting device mounted to the outer side of the container. In the first embodiment, the venting device comprises a door, which is the same door used by personnel to load the luggage into the container. The door has hinges and a latch, preferably which break away in the event of an explosion. An explosion propels the door outward through the outer skin or wall of the aircraft. This allows venting of the shock waves and high pressure to the exterior of the airplane. Preferably, a blade locates around the periphery of the door for slicing through the fuselage wall as the door is propelled outward.

The second manner in which damage is reduced is by constructing the container so as to withstand projectiles from being propelled through the other walls of the container into the interior of the aircraft. In order to handle this problem, the container is constructed of a composite material. The container is formed by wrapping composite filament or fabric in three different axis. The composite material reduces the chances for projectiles from passing through the walls of the container into the interior of the aircraft.

Also, the container, other than the door, is preferably a single integral member. The container is made in this manner by providing a form or mold. The layers of composite material are wrapped around the form in three different axis. After curing, the manufacturer can slice out a doorway and resecure the panel with hinges and a latch. The form is then removed from the container.

In a second embodiment, the venting device is a penetrator having a sharp leading end. The penetrator mounts slidably in a guide compartment in the container and is pointed toward the fuselage wall. A flexible hose connects to the trailing end of the penetrator. The hose has an interior end that extends to a port at the interior end of the guide compartment. High pressure gas due to an explosion flows through the hose and propels the penetrator toward the fuselage wall.

DETAILED DESCRIPTION OF THE INVENTION

Figure 1:
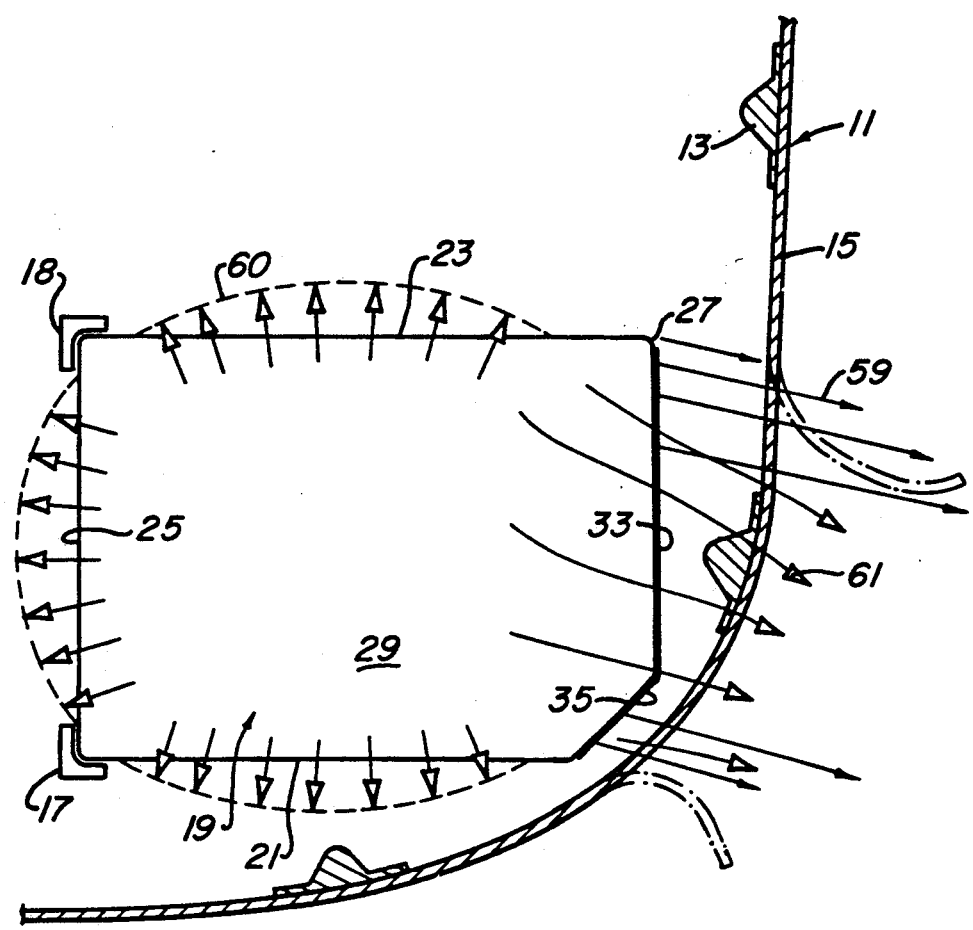
FIG. 1 is a schematic sectional view illustrating a portion of an airplane having a container located therein that is constructed in accordance with this invention.

Referring to FIG. 1, aircraft 11 has a fuselage wall 15 that includes a metal skin attached to a plurality of structural members 13, such as ribs, stringers, and longerons. The portion shown is one side of a cargo area of a large airliner. On large aircraft, there will be two side-by-side longitudinal rows (only one shown) of cargo containers 19, resting on a floor (not shown). Each row may have a number of containers 19. The containers 19 will contain luggage of the passengers and other material being shipped.

Figure 7:
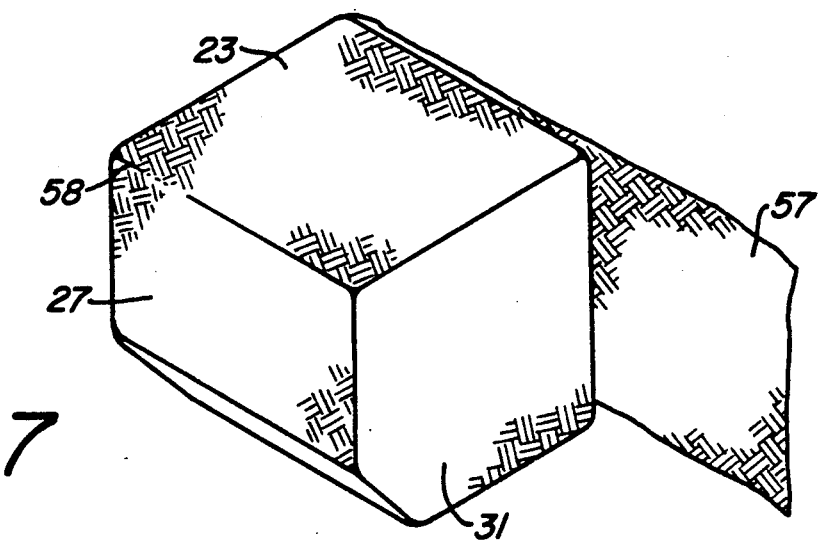
FIG. 7 is a perspective view showing a third step in the manufacturing process of the container of FIG. 1, showing a third layer being wrapped around the form.

Each container 19 is generally rectangular having flat sides, with typical overall dimensions being about 79 inches wide by 64 inches high by 60 inches deep. The sides include a bottom 21, a top 23, an inner side 25, an outer side 27, a forward side 29 and an aft side 31 (FIG. 7). The outer side 27 faces the fuselage wall 15 of aircraft 11. In the prior art, containers of this type have a loading door or curtain which is normally located on the forward or aft side.

Figure 2:
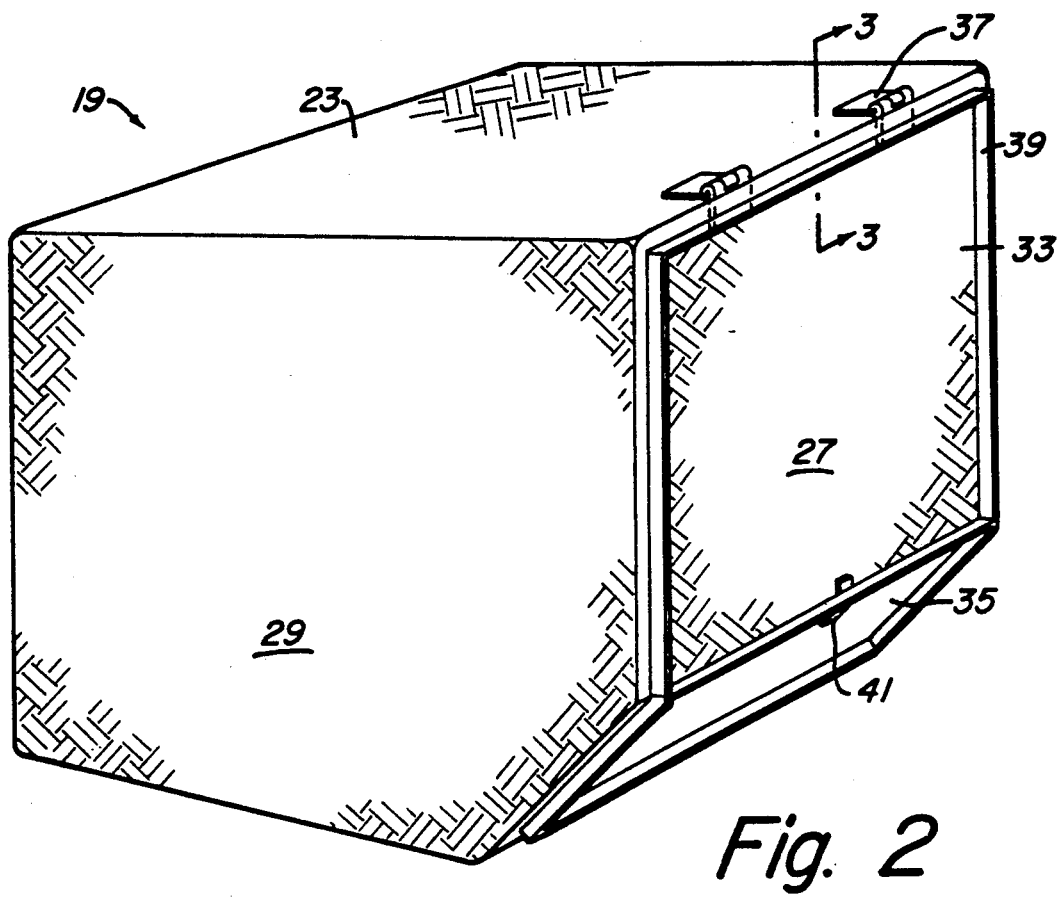
FIG. 2 is a perspective view of the container of FIG. 1.

Referring to FIGS. 1 and 2, outer side 27 in the preferred embodiment is made up of an upper door 33 and a lower door 35. Each door 33, 35 secures to container 19 by hinges 37 (only one set shown). Hinges 37 may be of a composite material extending full length of the door. The hinges 37 for upper door 33 secure the upper edge of upper door 33 to top 23. Although not shown, hinges 37 for lower door 35 secure a lower edge of lower door 35 to bottom 21. The hinges 37 for upper door 33 allow the upper door 33 to swing upward to an open position for access to the interior. The lower door 35 will swing downward to an open position.

Figure 3:
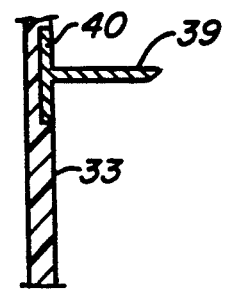
FIG. 3 is a sectional view of a portion of the container of FIG. 1, taken along the line III—III of FIG. 2.

Each door 33, 35 has means for facilitating penetration of the fuselage wall 15 of aircraft 11 in the event of an explosion. This means preferably is a blade 39. Each blade 39 is rectangular, circumscribing or extending around the periphery of each door 33, 35. Blade 39 protrudes from each door 33, 35 a short distance. As shown in FIG. 3, blade 39 may be a T-shaped member with the base 40 being bonded to the doors 33, 35. Blade 39 will slice through fuselage wall 15 and any structural members 13 when propelled outward with great force. Blade 39 is constructed of material, such as steel or titanium, that is harder than the material of structural members 13 and fuselage wall 15. That material will normally be of aluminum.

Figure 4:
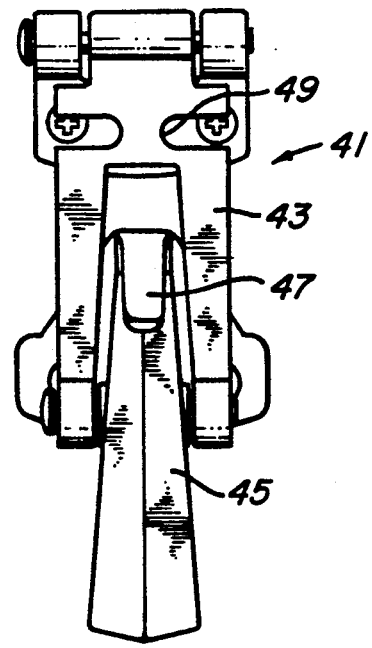
FIG. 4 is an enlarged front view of a latch for securing the doors together of the container of FIG. 1.

Doors 33, 35 secure to each other in a closed position such as shown in FIG. 2 by means of a latch 41. Latch 41 may be of various types. In FIG. 4, it is shown to include a hasp 43 that is hinged. A cam 45 pivotally mounts to hasp 43. Cam 45 will engage a retainer 47 secured to the upper edge of lower door 35.

Latch 41 is preferably provided with a means for causing latch 41 to part or break at a sufficient internal pressure or stress. This parting allows the doors 33, 35 to be propelled outward. The parting means in the embodiment shown is a weak point 49 located in hasp 43. Weak point 49 is an area of smaller cross section than the remaining portions of hasp 43. Weak point 49 is sized so as to part if sufficient force is applied between retainer 47 and hasp 43.

Figure 5:
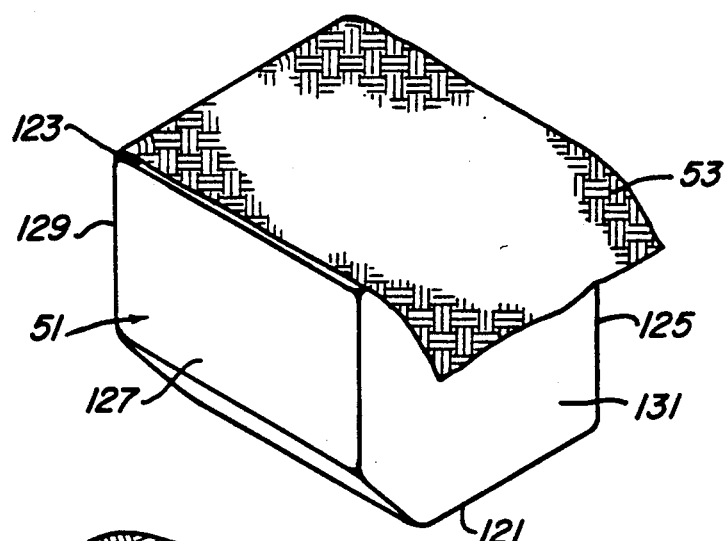
FIG. 5 is a perspective view showing the container of FIG. 1 being manufactured by a first layer being wrapped around a form.
Figure 6:
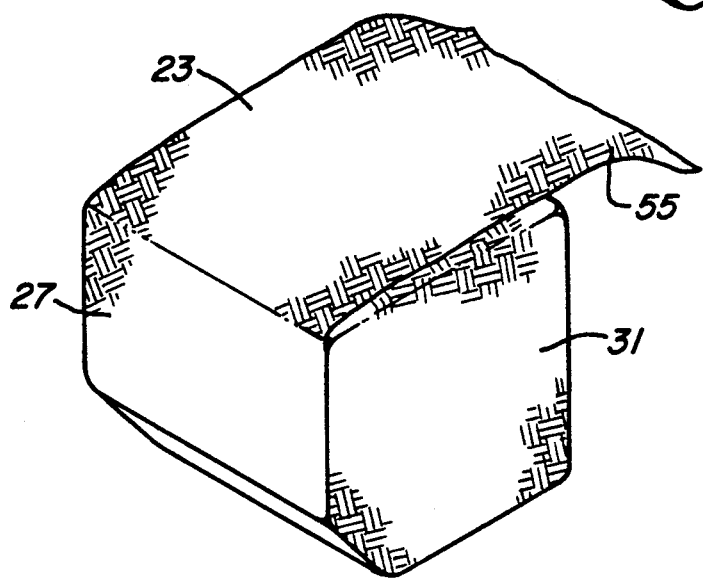
FIG. 6 is a perspective view showing a second step in the manufacturing process of the container of FIG. 1, showing a second layer being wrapped around the form.

FIGS. 5-7 illustrate a preferred method of constructing container 19. A form 51 will be utilized, which is in one embodiment may be a plurality of blocks of rigid foam material, such as polystyrene, stacked together. Form 51 has the same overall dimensions as the container 19. The bottom 121 corresponds to bottom 21, top 123 corresponds to container top 23 (FIG. 2), the inner side 125 corresponds to container inner side 25 (FIG. 1), the outer side 127 corresponds to container outer side 27 (FIG. 2), the forward side 129 corresponds to container forward side 29 (FIG. 2), and aft side 131 corresponds to aft side 31 (FIG. 7).

The manufacturer first wraps a layer 53 in one axis completely around the form 51. In the embodiment shown, layer 53 is being wrapped in an X axis. Layer 53, which has a width at least equal to the depth of the top 123, is wrapped in a continuous layer around top 123, aft side 131, bottom 121, and forward side 129. A few inches of overlapping will exist at the joint.

The manufacturer utilizes a second layer 55 to wrap in a Y axis, as illustrated in FIG. 7. Layer 55 has at least the width of top 123. Layer 55 wraps in a continuous layer around outer side 127, top 123, inner side 125 and the bottom 121. Similarly, FIG. 7 illustrates a third layer 57, which is wrapped in a Z axis. Third layer 57 extends around forward side 129, inner side 125, aft side 131 and outer side 127.

Layers 53, 55, 57 will be comprised of filaments or fabric, such as glass, aramid or carbon. In the preferred embodiment, the filaments are woven into a cloth. The layers 53, 55, 57 will be coated or impregnated in a resin, either before wrapping or after. After wrapping the form 51, the resin will be cured. This results in a structure which has edges and corners 58 that are integrally formed with each of the sides of container 19. Each of the sides, including bottom 21, top 23, inner side 25, outer side 27, forward side 29 and aft side 31 will have at least two layer thicknesses. Each edge and corner 58 will also have at least two thicknesses.

After curing, the operator can then use a saw to cut out panels of the outer side 27. This provides the doors 33, 35 (FIG. 2). The operator then secures hinges 37 (FIG. 2) and latch 41. The form 51 will be removed from the interior of container 19, which is rigid after curing. This may be handled by removing the separate pieces of the form.

In operation, as shown in FIG. 1, workers will store luggage and other cargo in container 19 by opening the doors 33, 35. The workers will close the doors 33, 35, securing them by latch 41 (FIG. 2). The workers will then store the cargo container 19 in the interior of aircraft 11. Doors 33, 35 will face outward and downward. Doors 33, 35 will be closely spaced inward from the fuselage wall 15.

In the event of an explosion within container 19, the container 19 will act initially as a pressure vessel. The sides of container 19, including bottom 21, top 23, inner side 25, forward side 29 and aft side 31, will bulge outward as indicated by the dotted lines 60. The shock waves and high pressure, indicated by the arrows 61 in FIG. 1, cause this bulging.

At the same time, the high pressure and shock waves indicated by arrows 61, will cause the weak point 49 (FIG. 4) of latch 41 to part. This allows the doors 33, 35 to open. The force of the explosion blows the hinges 37 apart or loose from the container 19, releasing the doors 33, 35 to be propelled outward through the fuselage wall 15. The blades 39 slice through the structural members 13 of fuselage wall 15. The solid arrows 59 indicate the outward movement of the doors 33, 35.

The shock waves and pressure due to the explosion will vent out the hole created in fuselage wall 15. The dimensions of the doors 33, 35 will be selected so that the cross sectional area of the hole created by the doors 33, 35 being blown outward will not be greater than what the aircraft can withstand and still be able to fly. The flexing of the composite sides of container 19 will prevent objects from being propelled through the interior of the plane, which could damage vital controls and other components.

Figure 8:
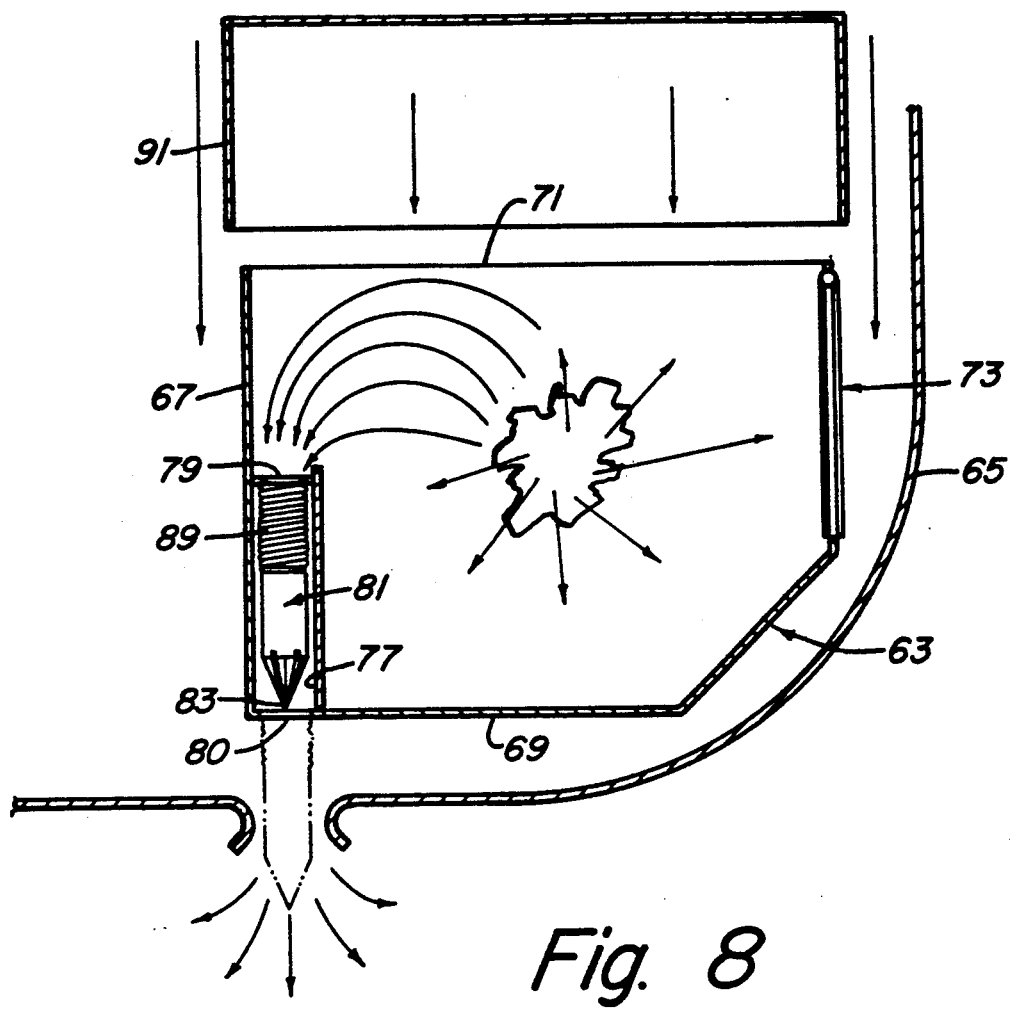
FIG. 8 is a schematic side view illustrating a second embodiment of a container constructed in accordance with the invention.
Figure 9:
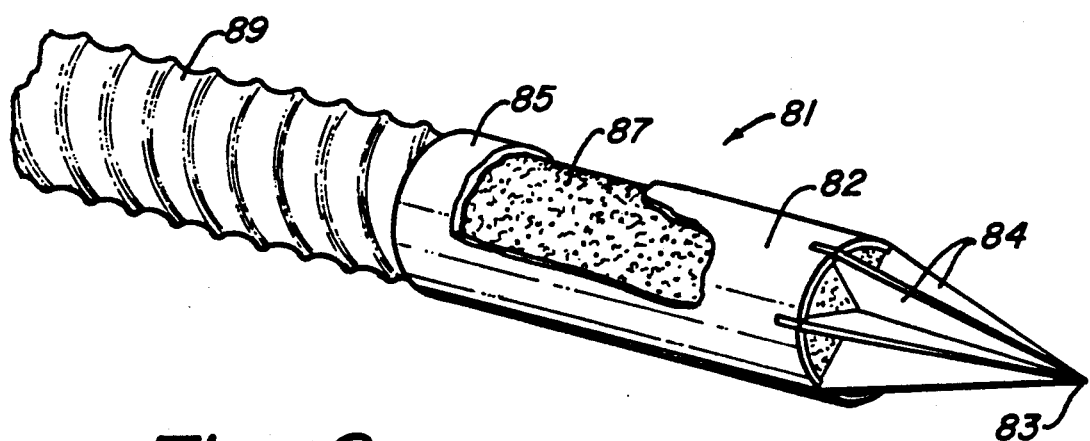
FIG. 9 is a perspective view of a penetrator used in the second embodiment of FIG. 8.

FIGS. 8 and 9 illustrate a second embodiment. This embodiment is particularly for use in an aircraft which might have hydraulic or electrical lines extending along portions of the outer portion of a fuselage wall. A venting device on an outer side of a container might damage such electrical or hydraulic lines when propelled outward as in the case of the first embodiment. The venting device of the second embodiment may be oriented in various directions, including downward, to avoid any hydraulic lines.

Container 63 of the second embodiment stores in the same position in the cargo hold of a large airplane. It will be located adjacent a fuselage wall 65. Container 63 has the same general overall dimensions as container 19 of the first embodiment and is also constructed preferably of the same material and methods. Container 63 has an inner side 67, bottom 69, a top 71 and forward and aft sides (not shown). It will have preferably only one door 73. Door 73 is located on the outer side of the container 63 and is hinged. Normally, there will not be a lower door, such as door 35 of FIG. 1.

A guide compartment 77 will be mounted inside container 63. Guide compartment 77 is shown oriented vertically with its exterior pointed downward. However, guide compartment 77 could also be oriented in a variety of other orientations. Guide compartment 77 is a compartment or section formed with the interior of container 63. Preferably, guide compartment 77 is located on the interior of inner side 67 and extends along most of the depth of inner side 67 from the forward edge to the aft edge. Guide compartment 77 is thus rectangular.

A port 79 locates at the interior end of guide compartment 77. Preferably, a thin frangible window locates over port 79. A similar frangible window locates over the exterior port or end 80 of guide compartment 77, which is a rectangular opening in bottom 69.

A plurality of penetrators 81 (only one shown) mount slidably inside guide compartment 77. Penetrators 81 locate side-by-side along guide compartment 77. Each penetrator 81, shown also in FIG. 9, has a tubular body 82 of metal. Penetrator 81 has a leading end 83 that is configured to pierce the fuselage wall 65. Preferably, leading end 83 forms a sharp pointed cone. Also, preferably, leading end 83 is made up of a plurality of triangular gussets 84. Gussets 84 are spaced apart from each other, providing openings which lead from the interior of tubular body 82 outward.

Each penetrator 81 has a trailing end 85 that is cylindrical. Body 82 may be filled with a filler material 87. This filler material is preferably a solid block of polystyrene foam. Filler material 87 extends from the trailing end 85 to the leading end 83.

A hose 89 has a leading end that will secure to the trailing end 85 of each penetrator 81. Each hose 89 is a strong flexible fabric, such as Kevlar, which may be folded into a stored position as shown in FIG. 8. The interior end of hose 89 mounts to port 79. Hose 89 has a length that is sufficient to allow penetrator 81 to pass at least partially through fuselage wall 65.

A rectangular sleeve 91, shown in a position above container 63 for clarity, will be used to reinforce door 73 and the sides of container 63. Sleeve 91 is lowered over the container after the luggage is stored and the door 73 closed. Sleeve 91 is also preferably formed of a wrapped, composite filament material.

In operation, cargo will be loaded in the interior of container 63 below guide compartment 77. Door 73 will be closed and sleeve 91 lowered in place. The container 63 will then be stowed in the hold of the airplane. In the event of an explosion, the high pressure gas will rupture the frangible windows at port 79 and exterior end 80. The gas will pass through port 79 and hoses 89. The high pressure gas will fill hoses 89 and act against the filler material 87 of penetrators 81. This creates a reaction, rapidly propelling penetrators 81 with great force along guide compartment 77. Penetrators 81 will move in the direction guided by guide compartment 77, which is downward in the embodiment shown, to pierce the fuselage wall 65 below the container 63.

Once pierced, the pressure will immediately disintegrate the filler material 87. The filler material 87 will flow outward through the open leading end of body 82 and between the gussets 84. Particles of filler material will be blown outward. The high pressure vents through the port 79, hoses 89 and penetrators 81 to atmosphere. Penetrators 81 will separate from the hoses 89 and fall.

The invention has significant advantages. By constructing the container so as to direct the explosive force out of the aircraft, the damage of the explosion can be reduced. While the airplane will have a precision hole in the fuselage wall, it will still be able to fly. The container is relatively light in weight. The composite walls prevent projectiles from damaging the interior of the plane, while simultaneously providing pressure vessel structural characteristics. The airplane does not have to be modified to accommodate this type of container. The second embodiment uses a penetrator which can be constructed so as to be aimed at portions of the fuselage wall to avoid the possibility of striking any electrical or hydraulic lines extending along the fuselage wall.

While the invention has been shown in only two of its forms, it should be apparent to those skilled in the art that it is not so limited, but is susceptible to various changes without departing from the scope of the invention. For example, the hinges for the doors in the first embodiment could be constructed strong enough to retain the doors. In that instance, the doors would swing or pivot outward, yet remain with the container. The blades would nevertheless slice through the fuselage wall of the airplane in a guillotine cutting motion described by a geometrical arc.

I claim:

1. In a container for holding cargo for storage in an airplane, the container adapted to be positioned near a fuselage wall of the airplane when stowed therein, an improved means for reducing damage caused by an explosive contained in the cargo, comprising in combination:

a venting device mounted to the container;

directing means for causing an explosion in the container to propel the venting device toward the fuselage wall of the airplane for piercing the fuselage wall of the air plane to vent the explosion; wherein the venting device comprises a door and a blade mounted to and protruding from the door; and wherein the directing means comprises:

connection means connecting the door to the outer side of the container for opening and closing the door, the connection means releasing the door to open in the event of an explosion of sufficient magnitude, to propel at least a portion of the door outward through the fuselage wall of the airplane with the blade slicing through the fuselage wall of the airplane.

2. In a container for holding cargo for storage in an airplane, the container adapted to be positioned near a fuselage wall of the airplane when stowed therein, an improved means for reducing damage caused by an explosive contained in the cargo, comprising in combination:

a venting device mounted to the container;

directing means for causing an explosion in the container to propel the venting device toward the fuselage wall of the airplane for piercing the fuselage wall of the air plane to vent the explosion; wherein the venting device comprises a door, and wherein the directing means comprises:

at least one hinge connecting the door to the container for opening and closing the door;

at latch connected to the door and to the outer side of the container for selectively locking the door to the container;

a weak point in the latch for causing the latch to part in the event of an explosion of sufficient magnitude; and the hinge being configured to release the door from the container in the vent of an explosion of sufficient magnitude, to propel the door outward from the container.

3. In a container for holding cargo for storage in an airplane, the container adapted to be positioned near a fuselage wall of the airplane when stowed therein, an improved means for reducing damage caused by an explosive contained in the cargo, comprising in combination:

a venting device mounted to the container;
directing means for causing an explosion in the container to propel the venting device toward the fuselage wall of the airplane for piercing the fuselage wall of the air plane to vent the explosion; wherein the venting device comprises:
a penetrator having a leading end configured for piercing the fuselage wall of the airplane and a trailing end; and wherein the directing means comprises:
mounting means for releasably mounting the penetrator to the container with the leading end pointed toward a portion of the fuselage wall of the airplane, and the trailing end in communication with the interior of the container in the event of an explosion, so that high pressure gas due to an explosion will act on the trailing end of the penetrator to propel the penetrator through the fuselage wall of the airplane.

4. In a container for holding cargo for storage in an airplane, the container adapted to be positioned near a fuselage wall of the airplane when stowed therein, an improved means for reducing damage caused by an explosive contained in the cargo, comprising in combination:

a venting device mounted to the container;
directing means for causing an explosion in the container to propel the venting device toward the fuselage wall of the airplane for piercing the fuselage wall of the air plane to vent the explosion; wherein the venting device comprises:
a penetrator releasably mounted to the container for piercing the fuselage wall of the airplane; and
a flexible hose having a leading end connected to the penetrator, the hose having an interior end in communication with the interior of the container in the event of an explosion so that gas pressure due to an explosion in the container fills the hose and propels the penetrator and leading end of the hose through the fuselage wall of the airplane.

5. In a container for holding cargo for storage in an airplane, the container adapted to be positioned near a fuselage wall of the airplane when stowed therein, an improved means for reducing damage caused by an explosive contained in the cargo, comprising in combination:

a venting device mounted to the container; wherein the venting device comprises:
a penetrator releasably mounted to the container for piercing the fuselage wall of the airplane; and
a flexible hose having a leading end connected to the penetrator, the hose having an interior end in communication with the interior of the container in the event of an explosion so that gas pressure due to an explosion in the container fills the hose and propels the penetrator and leading end of the hose through the fuselage wall of the airplane;
directing means for causing an explosion in the container to propel the venting device toward the fuselage wall of the airplane for piercing the fuselage wall of the airplane to vent the explosion; wherein the directing device comprises:
a guide compartment mounted to the container and oriented toward a selected portion of the fuselage wall of the airplane, the penetrator being slidably mounted in the guide compartment.

6. In a container for holding cargo for storage in an airplane, the container adapted to be positioned near a fuselage wall of the airplane when stowed therein, an improved means for reducing damage caused by an explosive contained in the cargo, comprising in combination:

a venting device mounted to the container;
directing means for causing an explosion in the container to propel the venting device toward the fuselage wall of the airplane for piercing the fuselage wall of the airplane to vent the explosion; wherein the venting device comprises:
penetrator means having a leading end configured for piercing the fuselage wall of the airplane; and wherein the directing means comprises:
a guide compartment mounted to the container having an exterior end and an interior end, the penetrator means being slidably carried in the guide compartment;
a port between the guide compartment and the interior of the container at the interior end of the guide compartment; and wherein the venting means further comprises:
a flexible hose having a leading end connected to a trailing end of the penetrator means, the hose having an interior end extending to the port, communicating the hose with the interior of the container in the event of an explosion so that gas pressure due to an explosion in the container fills the hose and propels the penetrator means from the guide compartment through the fuselage wall of the airplane.

7. An improved cargo container for storage in an airplane, for reducing damage caused by an explosive contained in the cargo, the container comprising in combination:

a top, bottom, inner side, forward side, aft side joined together by a plurality of edges and corners;
an outer side which is positioned to face a fuselage wall of the airplane when the container is stored therein;
a door;
connection means for connecting the door to the outer side of the container for opening and closing the door for access to the interior of the container, and for causing an exposition of sufficient magnitude to move the door at least partially through the fuselage wall of the airplane to vent the explosion; and
a blade circumscribing at least a portion of the door and protruding outward therefrom for slicing the fuselage wall of the airplane as the door is moved outward.

8. An improved cargo container for storage in an airplane, for reducing damage caused by an explosive contained in the cargo, the container comprising in combination:

a top, bottom, inner side, forward side, aft side joined together by a plurality of edges and corners;
an outer side which is positioned to face a fuselage wall of the airplane when the container is stored therein;
a door;

connection means for connecting the door to the outer side of the container for opening and closing the door for access to the interior of the container, and for causing an exposition of sufficient magnitude to move the door at least partly through the fuselage wall of the airplane to vent the explosion; wherein the connection means comprises:

a hinge connecting the door to the container;

a latch connected to the door and the container for selectively locking the door in a closed position; and a weak point in the latch for causing the latch to part in the event of an explosion of sufficient magnitude.

9. An improved cargo container for storage in an airplane, for reducing damage caused by an explosive contained in the cargo, the container comprising in combination:

a top, bottom, inner side, forward side, aft side joined together by a plurality of edges and corners;

an outer side which is positioned to face a fuselage wall of the airplane when the container is stored therein;

a door;

a blade circumscribing at least a portion of the door and protruding outward therefrom;

a hinge connecting the door to the outer side of the container for opening and closing the door for access to the interior of the container; and the top, bottom, inner side, forward side, aft side and corners being sufficiently strong in the event of an explosion to cause the hinge to release the door from the container, propelling the door outward from the container, causing the blade to slice through the fuselage wall of the airplane and the door to pass through the fuselage wall of the airplane to vent the explosion.

10. The container according to claim 9, further comprising:

a latch connected to the door and the container for selectively locking the door in a closed position; and a weak point in the latch for causing the latch to part in the event of an explosion of sufficient magnitude.

11. The container according to claim 9 wherein the container is constructed of a filament composite material, the edges and corners being integrally formed with the container.

12. A method of reducing damage caused by an explosion from an explosive contained in cargo carried on an airplane, comprising:

providing a container;

mounting a venting device to the container;

placing the cargo in the container;

placing the container in the airplane with the venting device facing a fuselage wall of the airplane; and in the event of an explosion, propelling the venting device toward the fuselage wall as a result of the pressure of the explosion, and piercing the fuselage wall of the airplane with the venting device to vent the pressure of the explosion; and wherein the step of mounting the venting device to the container comprises:

providing a guide compartment with an exterior end and an interior end; and mounting the venting device slidably in the guide compartment, so that pressure due to an explosion in the container enters the interior end of the guide compartment and pushes the venting device along the guide compartment and away from the container.

13. A method of reducing damage from an explosion from an explosive contained in cargo carried on an airplane, comprising:

providing a container with a door on an outer side that will open and close;

mounting a blade to an outer side of the door and protruding therefrom;

placing the cargo in the container;

placing the container in the airplane with the outer side facing a fuselage wall of the airplane; and in the event of an explosion, propelling the door outward as a result of the pressure of the explosion, and slicing the fuselage wall of the airplane with the blade to vent the pressure of the explosion.

14. An improved cargo container for storage in an airplane, for reducing damage caused by an explosive contained in the cargo, the container comprising in combination:

a penetrator having a leading end configured for piercing the fuselage wall of the airplane and a trailing end; and mounting means for releasably mounting the penetrator to the container with the leading end pointed toward a portion of the fuselage wall of the airplane, and the trailing end in communication with the interior of the container in the event of an explosion, so that high pressure gas due to an explosion will act on the trailing end of the penetrator to propel the penetrator through the fuselage wall of the airplane.

15. The container according to claim 14 further comprising:

a flexible hose having a leading end connected to the penetrator, the hose having an interior end in communication with the interior of the container in the event of an explosion, so that gas pressure due to an explosion in the container fills the hose and propels the penetrator and leading end of the hose through the fuselage wall of the airplane.

16. The container according to claim 14, wherein the mounting means comprises:

a guide compartment mounted to the container and oriented toward a selected portion of the fuselage wall of the airplane, the penetrator being slidably mounted in the guide compartment.

17. The container according to claim 14 wherein the mounting means comprises:

a guide compartment mounted to the container having an exterior end and an interior end, the penetrator being slidably carried in the guide compartment; and wherein the container further comprises:

a port between the guide compartment and the interior of the container at the interior end of the guide compartment; and wherein the container further comprises:

a flexible hose having a leading end connected to a trailing end of the penetrator, the hose having an interior end extending to the port, communicating the hose with the interior of the container in the event of an explosion so that gas pressure due to an explosion in the container fills the hose and propels the penetrator from the guide compartment through the fuselage wall of the airplane.

18. An improved cargo container for storage in an airplane, for reducing damage caused by an explosive contained in the cargo, the container comprising in combination:
- a penetrator having a leading end configured for piercing the fuselage wall of the airplane and a trailing end;
- a guide compartment mounted to the container having an exterior end and an interior end, the penetrator being slidably carried in the guide compartment;
- a port between the guide compartment and the interior of the container at the interior end of the guide compartment; and
- a flexible hose having a leading end connected to a trailing end of the penetrator, the hose having an interior end extending to the port, communicating the hose with the interior of the container in the event of an explosion, so that gas pressure due to an explosion in the container fills the hose and propels the penetrator from the guide compartment through the fuselage wall of the airplane.

19. The container according to claim 18 wherein the penetrator has a conical leading end with a tip.

20. The container according to claim 18 wherein the penetrator has a hollow interior that is contains a rigid foam that extends to the trailing end of the penetrator, the gas pressure due to an explosion acting on the rigid foam to provide a force on the penetrator to move it out of the guide compartment. the gas pressure due to an explosion subsequently disintegrating the foam to vent the pressure to the exterior.

* * * * *